United States Patent

Kalopissis et al.

[15] 3,658,455
[45] Apr. 25, 1972

[54] DYEING HAIR WITH AQUEOUS SOLUTION OF PHENYL-TOLUYL-OR PYRIDYL AMINO BASE COMPOUND AND BENZIMIDAZOLE COUPLER

[72] Inventors: Gregoire Kalopissis, Paris; Andree Bugaut, Boulogne sur Seine, both of France

[73] Assignee: Societe Anonyme dite: L'Oreal, Paris, France

[22] Filed: June 12, 1969

[21] Appl. No.: 832,867

[30] Foreign Application Priority Data

June 14, 1968 Luxembourg..............................56271

[52] U.S. Cl..............................................8/11, 8/39, 8/43, 260/309.2
[51] Int. Cl. ......................................................D06p 1/32
[58] Field of Search....................3/11, 32; 260/309.2; 96/100

[56] References Cited

FOREIGN PATENTS OR APPLICATIONS 23,193 10/1905 Great Britain..............................8/32
1,001,496 8/1965 Great Britain Primary Examiner—George F. Lesmes
Assistant Examiner—Patricia C. Ives
Attorney—Holcombe, Wetherill & Brisebois

[57] ABSTRACT

A composition for dyeing keratinic fibers comprises a mixture of a base compound having an aromatic nucleus substituted by (1) either two amino groups or (2) by an amino group and a hydroxyl group, the substituents being in the ortho or para position relative to each other, and, as a coupler, a benzimidazole derivative. The weight ratio of the base to the coupler in the composition generally ranges between 1:1 to 1:30 The composition is applied to the hair, preferably at a pH of 8–10 in amounts sufficient to dye the hair and in the presence of an oxidizing agent such as hydrogen peroxide.

6 Claims, No Drawings

DYEING HAIR WITH AQUEOUS SOLUTION OF PHENYL-TOLUYL-OR PYRIDYL AMINO BASE COMPOUND AND BENZIMIDAZOLE COUPLER

SUMMARY OF THE INVENTION

It is conventional to use dyeing compositions containing oxidation dyes (commonly known as bases) and especially aromatic ortho or para diamines and ortho or para aminophenols, for dyeing keratinic fibers, and particularly human hair. The shades obtained with these bases have been varied by using color modifiers or "couplers", and in particular aromatic meta diamines and meta aminophenols.

It is the object of the present invention to provide a new class of "couplers" which may be used with known oxidation dyes.

The present invention accordingly relates to a new article of manufacture which consists of a composition for dyeing keratinic fibers, and particularly human hair, which composition is essentially characterized by the fact that it contains:

1. At least one base selected from the group consisting of compounds having molecules which contain an aromatic nucleus having either two amino groups or one amino group and a hydroxyl group in ortho or para position with respect to each other. These amino groups may be unsubstituted and/or substituted amino groups and the term amino is used in its broad sense. Illustrative substituted amino groups include, alkylamino, dialkylamino, carbamylamino, aminoalkylamino, etc.

2. At least one coupler consisting of a benzimidazole responding to the general formula:

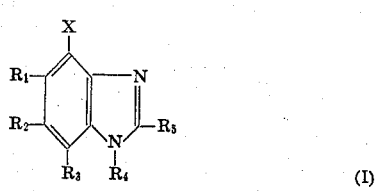

in which X represents a hydroxyl radical or -NH$_2$ group, R$_1$, R$_2$, R$_3$ and R$_5$ represent hydrogen or a methyl radical, with at least one of R$_1$ and R$_3$ being hydrogen, and R$_4$ represents hydrogen or an alkyl radical having 1 to 4 carbon atoms. It will be appreciated that the compounds of formula (I) may be used in the form of their acid salts and preferably their halohydric acid salts, such as HCl H Br, etc.

Among the bases which may advantageously be used with the couplers of formula (I) are: paraphenylene-diamine, paratolylenediamine, paraaminophenol, N-methyl-paraaminophenol, chloro-paraphenylene-diamine, methoxy-para-phenylene-diamine, 6-methoxy-3-methyl-para-phenylene-diamine, (N-ethyl-N-carbamyl-methyl)-para-phenylene-diamine, and 2,5-diamino-pyridine.

Among the couplers of formula (I) are 4-hydroxy-benzimidazole, 2-methyl-4-hydroxy-benzimidazole, (4-hydroxy-7-methyl-benzimidazole), 2-methyl-4-amino-benzimidazole, 1-methyl-4-hydroxy-benzimidazole, 1-butyl-4-hydroxy-benzimidazole.

In the hair dyeing compositions according to the invention, the ratio between the base and coupler may vary within broad limits. The preferred ratio range is 1/1 to 1/3 and in general an excess of coupler is preferred.

The hair dyeing compositions according to the invention may contain other dyes suitable for use under the same conditions, such as direct dyes (e.g. azo or anthraquinone dyes) or dyes obtained by combining bases and couplers other than those to which the present invention is directed.

The compositions according to the invention may also contain wetting agents, dispersing agents, penetrating agents, or other ingredients conventionally used in dyeing hair. They may take the form of an aqueous solution, a cream, or a gel.

The dyeing compositions according to the invention are used in the usual manner at an alkaline pH, preferably between 8 and 10, which pH may be obtained for example, by adding ammonia, and the compositions are applied to the hair in the presence of an oxidizing solution, which is preferably a hydrogen peroxide solution.

The new couplers according to the invention make it possible to obtain a very broad range of colors, extending from blonde to blues to gray.

It is a further object of the present invention to provide the new article of manufacture which consists of those of the above-defined compounds in which the substituent X is a hydroxyl group.

The invention also includes a method of preparing the new compounds characterized by the fact that a compound having the following formula is treated at reflux with hydrobromic acid.

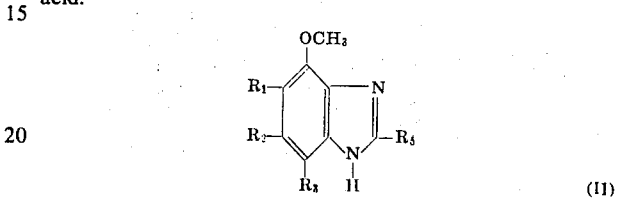

In this formula the symbols R$_1$, R$_2$, R$_3$, and R$_5$ respond to the definition hereinbefore given, either directly, or after reaction with an alkylation agent, R$_4$Z, in which Z represents a halogen.

Representative examples of the preparation of new couplers and the preparation of dyeing compositions containing them will now be given purely by way of illustration. The percentages are given in terms of parts or percentages by weight, and the temperatures in degrees centigrade.

EXAMPLE 1

Preparation of 4hydroxy-benzimidazole hydrobromide

The process is started with 4-methoxy-benzimidazole (Melts at 170°), a product which is described in known chemical literature, and is obtained by heating 2,3-diamino anisole dihydro-chloride in the presence of formic acid.

(4-methoxy-benzimidazole - Chem. Abst. 48-6436h and 4-methoxy 2-methyl benzimidazole - J. Pharm. and Pharmacol 8 661 1956)

0.075 mols (11.1g) of 4-methoxy benzimidazole is heated at reflux for 5 hours in 50 cm$^3$ of bromohydric acid (density = 1.78). After cooling, 15.5g of 4-hydroxy benzimidazole hydrobromide is separated out by drying. After recrystallization in bromohydric acid this melts with decomposition at 275°–278°.

| Analysis | Calculated by C$_7$H$_7$N$_2$O Br | Found |
|---|---|---|
| C % | 39.07 | 39.06 |
| H % | 3.25 | 3.30 |
| N % | 13.02 | 13.21 |

EXAMPLE 2

Preparation of 2-methyl-4-hydroxy benzimidazole hydrobromide

The process is started with 2-methyl-4-methoxy benzimidazole (which melts at 164°), a product which is described in known literature, which is obtained by heating 2,3-diamino anisole dihydrochloride in acetic acid.

0.063 mols (10.2g) of 2-methyl-4-methoxy benzimidazole is heated to reflux in 45 cm$^3$ of hydrobromic acid (density = 1.78). After cooling, drying yields 12.5g of 2-methyl-4-hydroxy-benzimidazole hydrobromide which, after recrystallization in hydrobromic acid, melts with decomposition at 276°–280°.

| Analysis | Calculated for C$_8$H$_9$N$_2$O Br | Found |
|---|---|---|
| C % | 41.92 | 41.63–41.64 |
| H % | 3.93 | 3.83–4.01 |
| N % | 12.22 | 12.11 |

EXAMPLE 3

Preparation of 4-hydroxy-7-methyl benzimidazole hydrobromide

The starting product is 2,3-dinitro-4-methyl anisole (which melts at 133° C), which product is described in chemical literature and may be obtained by nitrating 3-nitro-4-methyl anisole.

The dinitro derivative is reduced to 2,3-diamino-4-methyl anisole and this orthodiamine is then transformed by the conventional Phillipp process into 4-methoxy-7-methyl benzimidazole which, after treatment with hydrobromic acid, yields 4-hydroxy-7-methyl-benzimidazole hydrobromide.

FIRST STEP

Preparation of 2,3-diamino-4-methyl anisole dihydrochloride 0.05 mols (10.6g) of 2,3-dinitro-4-methyl anisole is added little by little, while stirring, to a mixture containing 29.4g of powdered zinc and 0.5g of ammonium chloride in 165 cm$^3$ of absolute alcohol and 42 cm$^3$ of water, which mixture has first been heated to 70° C. When the reduction has been completed the reaction mixture is dried and the filtrate introduced into 35 cm$^3$ of concentrated hydrochloric acid which has first been cooled to −10°. After a night at −10°, it is dried and after washing with acetone the yield is 10.4g of 2,3-diamino-4-methylanisole dihydrochloride.

SECOND STEP

Preparation of 4-methoxy-7-methyl benzimidazole 0.0462 mols (10.4g) of 2,3-diamino-4-methyl anisole dihydrochloride is heated for four hours at reflux in 70 cm$^3$ of formic acid.

This is vacuum dried and the residue is dissolved in 50 cm$^3$ of water, and alkalized with ammonia. Drying yields 6g of 4-methoxy-7-methyl benzimidazole which, after recrystallization in propyl alcohol, melts at 233°.

The molecular weight, as determined by potentiometric measurement, was 162.

THIRD STEP

Preparation of 4-hydroxy-7-methyl benzimidazole hydrobromide 0.03 mols (4.86g) of 4-methoxy-7-methyl benzimidazole is heated at reflux for 5 hours in 20 cm$^3$ of hydrobromic acid (density = 1.78). After cooling, drying yields 6.8g of 4-hydroxy-7-methyl benzimidazole bromohydride which, after recrystallization in hydrobromic acid, melts and decomposes at 268°–270° (hygro-scopic).

EXAMPLE 4

Preparation of 1-methyl-4-hydroxy benzimidazole hydrobromide 4-methoxy benzimidazole is treated with methyl iodide to obtain 1-methyl-4-methoxy benzimidazole, which is then treated with hydrobromic acid.

FIRST STEP

Preparation of 1-methyl-4-methoxy benzimidazole 0.127 mols (18g) of methyl iodide is added to a solution of 0.0845 mols (12.5g) of 4-methoxy benzimidazole in 125 cm$^3$ of absolute alcohol containing 0.127 mols (7.1g) of potash. The reaction mixture is left overnight at the ambient temperature, and filtered. The alcohol is evaporated and the residue fractionally distilled under vacuum. The yield is 10.5g of 1-methyl-4-methoxy benzimidazole.

$E$ 0.5 mm = 121°*(*Ebullition point under a pressure of 0.5 mm of mercury.), Melting point = 50°

SECOND STEP

Preparation of 1-methyl-4-hydroxy benzimidazole hydrobromide 0.064 mols (10.49 g) of 1-methyl-4-methoxy benzimidazole is heated at reflux for four hours in 45 cm$^3$ of hydrobromic acid (density = 1.78). After cooling, drying yields 8g of 1-methyl-4-hydroxy benzimidazole hydrobromide, which melts and decomposes at 230°–232°.

EXAMPLE 5

Preparation of 1-butyl-4-hydroxy benzimidazole hydrobromide 4-methoxy benzimidazole is treated with butyl bromide to obtain 1-butyl-4-methoxy benzimidazole, which is then treated with hydrobromic acid.

FIRST STEP

Preparation of 1-butyl-4-methoxy benzimidazole 0.063 mols (8.63g) of normal butyl bromide is added to a solution of 0.042 mols (6.26g) of 4-methoxy benzimidazole in 35 cm$^3$ of absolute alcohol containing 0.063 mols (3.53g) of potash. The reaction mixture is heated at reflux for 3 hours, cooled and filtered. The alcohol is filtered and the residue is fractionally distilled under vacuum. The yield is 6.52g of 1-butyl-4-methoxy benzimidazole in the form of a thick colorless oil.

$E$ 0.5 mm = 160°.

SECOND STEP

Preparation of 1-butyl-4-hydroxy benzimidazole hydrobromide 0.048 mols (9.73 g) of 1-butyl-4-methoxy-benzimidazole is heated at reflux for four hours in 35 cm$^3$ of hydrobromic acid (density = 1.78). After cooling, drying yields 8.20 g of 1-butyl-4-hydroxy benzimidazole hydrobromide which melts and decomposes at 154°–157°.

EXAMPLE 6

The following dyeing solution is prepared:

| | |
|---|---|
| Paratolylene diamine | 1 g |
| Paraaminophenol | 0.5 g |
| 4-hydroxy-7-methyl benzimidazole | 2 g |
| Aqueous solution of lauryl ammonium sulfate containing 20% of the active product expressed as lauryl alcohol | 20 g |
| Ethylene-diamino-tetraacetic acid sold under the trademark "TRILON B" | 0.3 g |
| 20% ammonia | 10 g |
| 40% sodium bisulfite | 1 g |
| Water q.s.p. | 100 g |

This solution is mixed weight for weight with 6 percent hydrogen peroxide and left 30 minutes on 100 percent white hair. The result is a reddish chestnut color, which is stable when exposed to the light.

EXAMPLE 7

The following dyeing solution is prepared:

| | |
|---|---|
| 2-methyl-4-amino-5-methoxy aniline | 1.2 g |
| Paraaminophenol | 0.5 g |
| Resorcinol | 0.1 g |
| 4 hydroxy-7-methyl-benzimidazole | 2 g |
| Aqueous solution of lauryl ammonium sulfate (20% lauryl alcohol) | 20 g |
| Ethylene-diamino-tetraacetic acid sold under the trademark "TRILON B" | 0.3 g |
| 20% ammonia | 10 g |
| 40% sodium bisulfite | 1 g |
| Water q.s.p. | 100 g |

This solution, mixed weight for weight with 6 percent hydrogen peroxide is left for 30 minutes on 100 percent white hair. The result is a bright golden chestnut, which is stable when exposed to light.

EXAMPLE 8

The following dyeing solution is prepared:

| | |
|---|---|
| Paratolylene diamine | 1 g |
| N-methyl paraaminophenol | 0.6 g |

| Resorcinol | 0.1 g |
| --- | --- |
| 4-hydroxy benzimidazole hydrobromide | 1.9 g |
| Lauryl ammonium sulfate solution (20% lauryl alcohol) | 20 g |
| Ethylene-diamino-tetraacetic acid sold under the trademark "TRILON B" | 0.3 g |
| 20% ammonia | 10 g |
| 40% sodium bisulfite | 1 g |
| Water q.s.p. | 100 g |

This solution, mixed weight for weight with 6 percent hydrogen peroxide is left 30 minutes on 100 percent white hair. The result is a plum-colored chestnut shade which is stable when exposed to the light.

EXAMPLE 9

The following dyeing solution is prepared:

| Paratolylene diamine | 1 g |
| --- | --- |
| 4-hydroxy-7-methyl-benzimidazole | 2 g |
| Lauryl ammonium sulfate solution (20% lauryl alcohol) | 20 g |
| Ethylene-diamino-tetraacetic acid sold under the trademark "TRILON B" | 0.3 g |
| 20% ammonia | 10 g |
| 40% sodium bisulfite | 1 g |
| Water q.s.p. | 100 g |

This solution when mixed weight for weight with 6 percent hydrogen peroxide and applied to 100 percent white hair, yields, at the end of 30 minutes a reddish chestnut which is stable to the light.

EXAMPLE 10

The following dyeing solution is prepared:

| 2-methyl-4-amino-6methoxy-aniline | 1.2 g |
| --- | --- |
| 4-hydroxy-7-methyl-benzimidazole | 2 g |
| Lauryl ammonium sulfate solution (20% lauryl alcohol) | 20 g |
| Ethylene-diamino-tetraacetic acid sold under the trademark "TRILON B" | 0.3 g |
| 20% ammonia | 10 g |
| 40% sodium bisulfite | 1 g |
| Water q.s.p. | 100 g |

This solution, when mixed weight for weight with 6 percent hydrogen peroxide and applied to 100 percent white hair yields, after 30 minutes, a bright golden chestnut which is stable when exposed to the light.

EXAMPLE 11

The following dyeing solution is prepared:

| Paratolylene diamine | 1 g |
| --- | --- |
| 4-hydroxy benzimidazole hydrobromide | 1.9 g |
| Lauryl ammonium sulfate solution (20% lauryl alcohol) | 20 g |
| Ethylene-diamino-tetraacetic acid sold under the trademark "TRILON B" | 0.3 g |
| 20% ammonia | 10 g |
| 40% sodium bisulfite | 1 g |
| Water q.s.p. | 100 g |

This solution, when mixed weight for weight with 6 percent hydrogen peroxide and applied to 100 percent white hair, yields, at the end of 30 minutes, a bluish black which is stable when exposed to the light.

EXAMPLE 12

The following dyeing solution is prepared:

| 2-methyl-4-amino benzimidazole dihydrochloride | 0.55 g |
| --- | --- |
| Para-tolylene diamine | 0.53 g |
| 20% ammonia q.s.p. | pH 9 |
| Water q.s.p. | 100 g |

This solution, when mixed weight for weight with 6 percent hydrogen peroxide and applied to 100 percent white hair, yields, after 30 minutes a bluish green.

EXAMPLE 13

The following dyeing solution is prepared:

| Para-tolylene diamine | 1 g |
| --- | --- |
| 2-methyl-4-hydroxy benzimidazole hydrobromide | 2 g |
| Lauryl ammonium sulfate solution (20% lauryl alcohol) | 20 g |
| Ethylene-diamino-tetraacetic acid sold under the trademark "TRILON B" | 0.3 g |
| 20% ammonia | 10 g |
| 40% sodium bisulfite | 1 g |
| Water q.s.p. | 100 g |

This solution, when mixed weight for weight with 6 percent hydrogen peroxide and left for 30 minutes on 100 percent white hair, yields a violet blue.

EXAMPLE 14

The following dyeing solution is prepared:

| Para-tolylene diamine | 1 g |
| --- | --- |
| 1-butyl-4-hydroxy benzimidazole hydrobromide | 2.5 g |
| Lauryl ammonium sulfate solution (20% lauryl alcohol) | 20 g |
| Ethylene-diamino-tetraacetic acid sold under the trademark "TRILON B" | 0.3 g |
| 20% ammonia | 10 g |
| 40% sodium bisulfite | 1 g |
| Water q.s.p. | 100 g |

This solution, when mixed weight for weight with 6 percent hydrogen peroxide and applied to 100 percent white hair, produces, at the end of 30 minutes, a deep blue.

The salts that are produced in the foregoing examples may be reconverted to the corresponding compounds of Formula I in any manner desired. For example, 1-methyl-4-hydroxy-benzimidazole is formed when the hydro bromide salt of example 4 is placed in an ammonia solution having a pH of 8 at 251° F.

What is claimed is:

1. A composition for dyeing keratinic fibers which comprises an aqueous solution of
   a. at least one base compound having an aromatic nucleus selected from group consisting of phenyl and pyridyl, said nucleus being substituted with a set of substituents selected from the group consisting of (1) two amino groups and (2) an amino group and a hydroxyl group, said substituents being in ortho or para position with respect to each other; and
   b. at least one coupler selected from the group consisting of
   (3) a benzimidazole derivative having the formula:

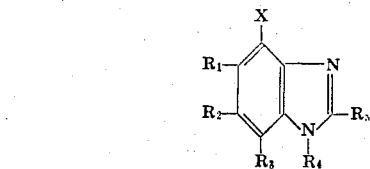

in which X is selected from the group consisting of hydroxyl and -NH$_2$, R$_1$, R$_2$, R$_3$ and R$_5$ are selected from the group consisting of hydrogen and methyl with at least one of R$_1$ and R$_3$ representing hydrogen, and R$_4$ is selected from the group consisting of hydrogen and alkyl having 1 to 4 carbon atoms and (4) the acid salts of said derivative, the weight ratio of said base to said coupler ranging between 1:1 to 1:3.

2. The composition of claim 1 in which said base is selected from the group consisting of paraphenylenediamine paratolylenediamine, paraaminophenol, N-methyl-para-aminophenol, chloro-para-phenylene-diamine, methoxy-para-phenylene-diamine, 6-methoxy-3-methyl-paraphenylene-diamine, (N-ethyl, N-carbamylmethyl)-para-phenylene-diamine, and 2,5 diaminopyridine.

3. The composition of claim 1 in which said coupler is selected from the group consisting of 4-hydroxy-benzimidazole, 2-methyl-4-hydroxy-benzimidazole, 4-hydroxy-7-methyl-benzimidazole, 2-methyl-4-amino-benzimidazole, 1-methyl-4-hydroxy-benzimidazole, and 1-butyl-4-hydroxy-benzimidazole.

4. The composition of claim 1 having a pH of 8–10.

5. A method of dyeing hair which comprises applying to the hair in amounts sufficient to dye said hair the composition of claim 1 at a pH of 8–10 in the presence of a solution of an oxidizing agent.

6. The method of claim 5 wherein said oxidizing agent is hydrogen peroxide.

* * * * *